United States Patent
Johnson Siemion

[19]

[11] Patent Number: 5,556,167
[45] Date of Patent: Sep. 17, 1996

[54] COLLAPSIBLE FOOT REST FOR SEAT BACKS

[76] Inventor: Helen F. Johnson Siemion, P.O. Box 423, Leavenworth, Wash. 98826

[21] Appl. No.: 497,543

[22] Filed: Jun. 30, 1995

[51] Int. Cl.⁶ ............................................. A47C 7/52
[52] U.S. Cl. ........................ 297/423.15; 297/423.40
[58] Field of Search ................................ 297/392, 395, 297/423.1, 423.15, 423.39, 423.40; 102/150

[56] References Cited

U.S. PATENT DOCUMENTS

| | | | |
|---|---|---|---|
| 402,130 | 4/1889 | Bedford | 297/423.15 X |
| 781,531 | 1/1905 | Jones | 297/423.15 X |
| 1,218,876 | 3/1917 | Liverson | 297/423.40 X |
| 3,285,658 | 11/1966 | Cleveland | 297/392 X |

FOREIGN PATENT DOCUMENTS

| | | | |
|---|---|---|---|
| 378931 | 7/1921 | Germany | 297/395 |
| 899510 | 12/1953 | Germany | 297/395 |

Primary Examiner—Peter R. Brown
Attorney, Agent, or Firm—David L. Tingey

[57] ABSTRACT

A foot rest constructed of a flexible cord is configured with two parallel side cords with bottom ends joined by a cross cord thereby forming a U-shape with the cross cord serving as a base rung. Additional rungs are also provided between the side cords parallel to the base rung which serve as optional foot rests in varying heights. Side top ends are adjustably joined to form a closed loop sized to fit over a fold-down table of an airline seat back from which the foot rest hangs to support a user's feet on a single rung or on staggered rungs. The rungs are spaced apart such that a user's leg may optionally be supported by extending the leg through the foot rest.

7 Claims, 2 Drawing Sheets

COLLAPSIBLE FOOT REST FOR SEAT BACKS

BACKGROUND OF THE INVENTION

This invention relates to foot rests and particularly to portable footrests for use in conjunction with airline seats, the foot rest being collapsible and exclusively of nonrigid parts for stuffing in a bag or purse, adapted to hang on a seat back intermediate its height for use by one seated behind the seat even when the seat back is relcined toward the user.

It is a common desire in seated travelers to rest their feet in a position elevated from the floor. Changing a leg position from time to time during travel changes the stretch of a user hamstring leg muscle and then the lumbar muscles, keeping the lumbar muscles from tightening and countering the common low back ache experienced commonly among travelers. It has also been determined that such changing of positions is enhanced when the legs are not at the same height, thus the need for a plurality of rungs working in concert rather than simply a foot rest adjustable in height.

It is also desirous that a foot rest be light-weight and fully flexible so that it can easily be stuffed into a travel bag or purse suitable as a carry-on item on an airplane without damaging any foot rest elements through bending.

It is known to have various foot support straps attached to and hanging from the top of a seat-back. However, this is at least bothersome and generally unusable in the instance of an airline seat or other such seat that reclines toward the foot support user. In such configuration, the seat back top extends rearwardly significantly over leg space of the next-rearward seat. Thus, any support device hanging from the reclined seat back top falls onto the lap of the user seated behind the seat back making the support unusable.

Thus, an object of the invention is to provide a collapsible multiple-rung foot rest fabricated exclusively of flexible cords suitable for stuffing in a purse or carry-on bag. A further objective is to mount the foot rest intermediate the height of a seat back such that the foot rest hangs close to a seat back base, forward in the leg space of the next rearward seat occupant even when the seatback is reclined. It is a still further objective that no element of the foot rest or its attachment to a seat back extends to or over the seat top so that a person seated in the seat is unaware of the foot rest and cannot be distrubed by elements of the foot rest attaching to the seat top. It is another objective that the foot rest be adapted to support a user's leg extending through the foot rest over a rung. Yet another objective is that the foot rest swing freely from the seat back even under the seat back and the seat attached thereto to allow the user's foot to fully extend under the seat while still being supported by the foot rest and to exercise in the foot rest by swinging the foot rest thereby encouraging improved blood circulation in the user's legs and feet. It is a final objective that the foot rest be adaptable to support both user's feet on a single support level or optionally to stagger support height between the user's feet without foot rest adjustment by simply placing a foot on another selective support rung.

SUMMARY OF THE INVENTION

The objectives are achieved in a foot rest constructed exclusively of a flexible cord or strap. The pliant foot rest is configured with two parallel side cords with a set of ends joined by a base cross cord thereby forming a U-shape with the cross cord serving as a base rung. Additional rungs are also provided between the side cords parallel to the base rung which serve as optional foot rests in varying heights along the side.

The several rungs are vertically spaced apart from each other sufficiently for a user's foot or leg to pass between two adjacent rungs to optionally support the leg. This allows the user to fully straighten and extend his leg while still being supported by the foot rest.

So that the foot rest can be attached to a support brace of a fold-down table of a next forward seat back by looping over the fold-down table and its support brace attached intermediate the seat back. The foot rest cord sides are typically connected near the foot rest top forming a closed loop. Clearly, another other suitable means of securing to the support brace would suffice; for convenience, a closed loop is provided. Any suitable means for connecting the cord ends suffices, such as hook and loop tape fasteners. The loop at its top is then necessarily sized to fit over a seat-back fold-down table and support brace. The connection is typically adjustable so that the height of the foot rest can be adapted to the use and comfort of the user who is sitting behind the seat from which the foot rest hangs.

DESCRIPTION OF THE PREFERRED EMBODIMENT

Figure 2:
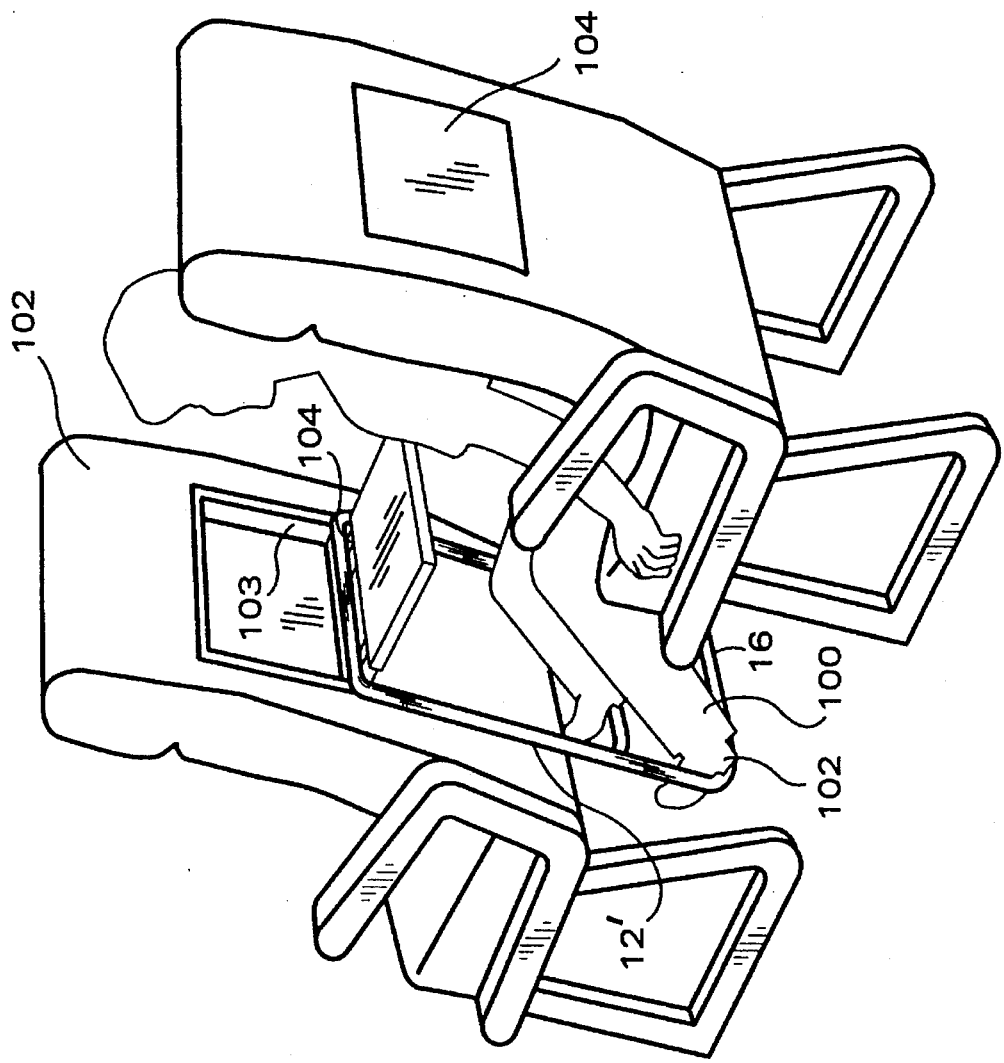
FIG. 2 shows the foot rest hanging from a seatback table with a user's feet resting on the rungs.
Figure 1:
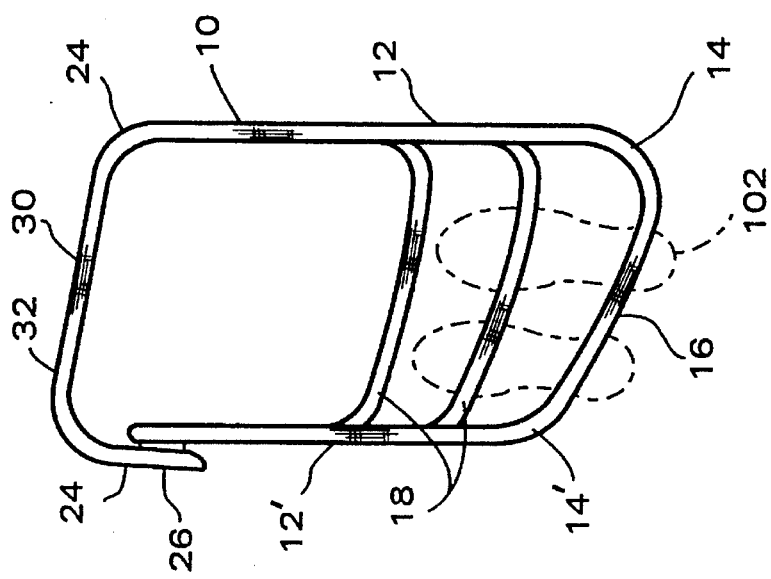
FIG. 1 is a front perspective view of the foot rest with 2 user's shoes superimposed side-by-side on a rung.
Figure 4:
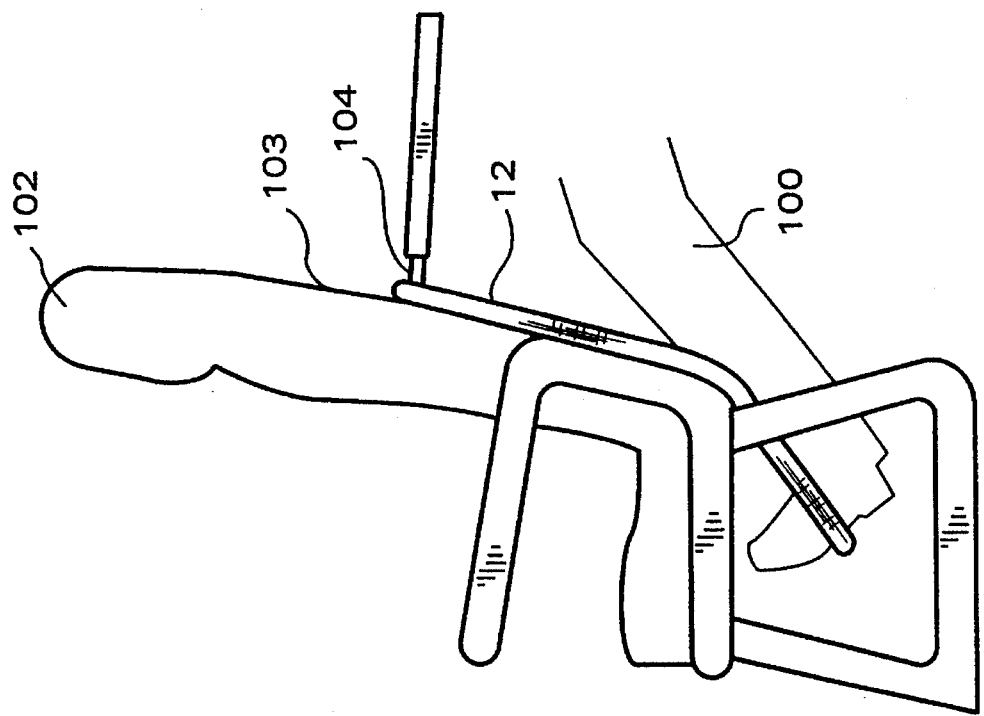
FIG. 4 shows the foot rest swung forward by a user's feet under a seat.
Figure 3:
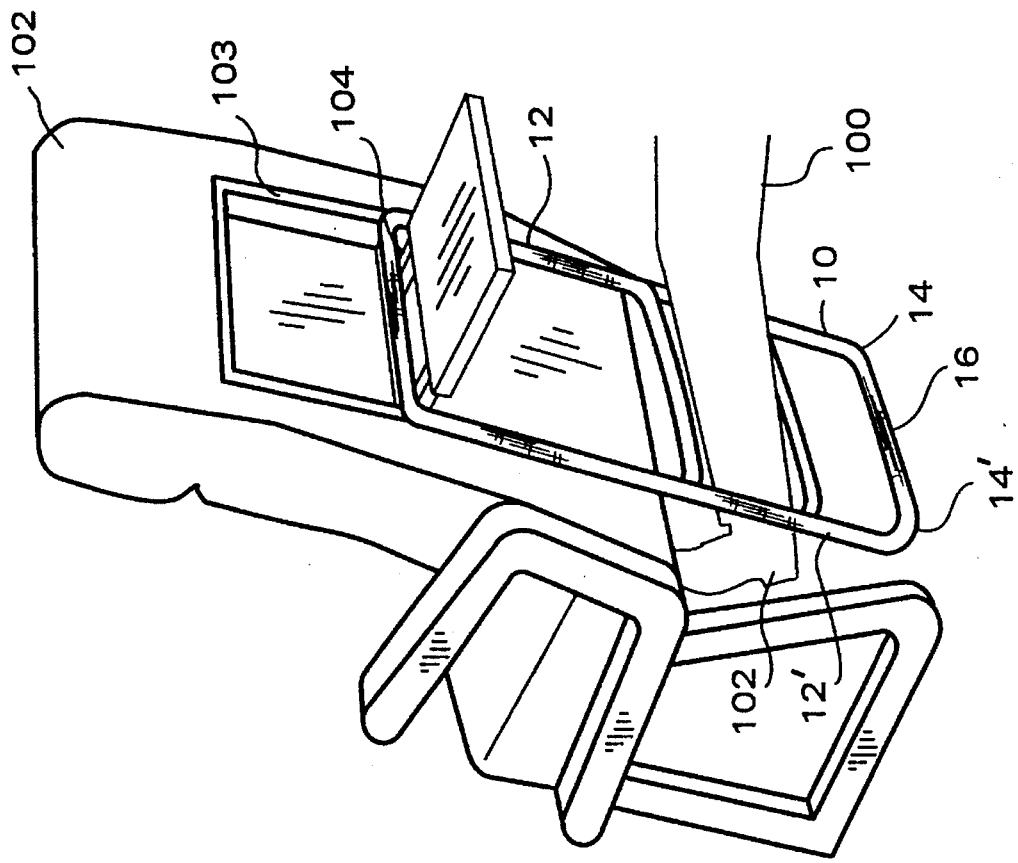
FIG. 3 shows the foot rest hanging from a seatback table with a user's leg resting on one of the rungs.

As shown in the figures, the foot rest of the present invention exclusively comprising supple components includes a flexible cord 10 having fully flexible parallel sides 12 and 12' joined at first ends 14 and 14' by a base rung 16 therein forming a pliable U-shape such that the base can can be swung forward and under a supporting seat 102, the flexible sides bending to follow the contours of the supporting seat 102 as they are urged against the seat. The foot rest further comprises additional rungs 18 between the sides 12 parallel to the base rung 16. The rungs 18 are mutually spaced apart on the sides 12 a distance such that a user's leg 100 can pass between rungs to optionally support the leg instead of a foot 102 at selective heights. The sides 12 are further spaced apart by the several rungs 18 a distance sufficient for both user feet to be supported side by side on a single rung.

The sides 12 are adapted to adjustably connect at side second ends 24, such as through use of hook and loop tape fastener 26 on corresponding respective second ends 24 forming a closed, flexible loop 30 with a loop top 32 sized to fit over a seat-back fold-down table 104 intermediate the back 103 of the seat 102, all elements of the foot rest remaining rearward of the seat back and spaced apart from the seat front on top such that a seat user would not contact the foot rest while leaning against the seat back or resting his head on the seat back top.

It is understood that any other suitable means of connecting the cord side second ends may be employed, such as a buckle, without detracting from the invention, and is deemed to be included.

I claim:

1. A collapsible foot rest disposed to stuffing in a carry-on bag comprising two flexible sides in parallel each with first and second ends and with a base rung joining side first ends forming a "U" shape with distal second ends mutually attached to form a closed loop, all exclusively of supple cord suitable for stuffing, one or more additional spaced apart rungs of flexible, supple cord secured parallel to the base rung between the sides to optionally support a first foot on a rung at a selective height and a second foot on a rung at a different height, all also exclusively of supple cord suitable for stuffing, pliant means for mutually attaching one distal second end to the other distal second end to form the closed loop such that the foot rest can hang from the closed loop.

2. The collapsible foot rest of claim 1 in combination with a seat back having a fold-down table therein, the foot rest loop hanging from the seat back.

3. The foot rest of claim 1 in which the means for mutually attaching one distal second end to the other distal second end to form the closed loop is adjustable to increase or decrease the loop formed so that the height of the rungs is selectively positioned.

4. The foot rest of claim 1 wherein the additional rungs are spaced apart a distance sufficient for a user's leg to pass between rungs such that a rung supports the user's leg.

5. A collapsible foot rest in combination with a seat back, the foot rest hanging from the seat back, comprising a base rung of length Suitable for supporting two user's feet simultaneously, two flexible parallel foot rest sides, each with first and second ends said first ends being attached to and spaced apart by said base rung forming a "U" shape and pliable such that when said second ends are attached to the seat back, base rung is extendable under the seat back and a seat attached thereto in supporting a user's foot thereon with the pliable sides tracing a seat back contour, one or more additional spaded apart rungs of flexible, supple cord secured parallel to the base rung between the sides to optionally support a first foot on a rung at a selective height and a second foot on a rung at a different height, all also exclusively of supple cord suitable for stuffing, means for attaching the second ends to the seat back such that the foot rest hangs from the seat back near a seat back base when the seat back is reclined toward a foot rest user seated behind the seat back.

6. The foot rest of claim 5 in which the entire foot rest is comprised exclusively of flexible cord such that the foot rest is collapsible and wholely pliable for stuffing in a carry-on bag.

7. The combination of claim 5 in which the means for attaching the second ends to a seat back comprises a fold-down table in the seat back, said footrest second ends mutually attached to form a closed loop with the closed loop hanging over the seat-back fold-down table.

* * * * *